Figure 1:
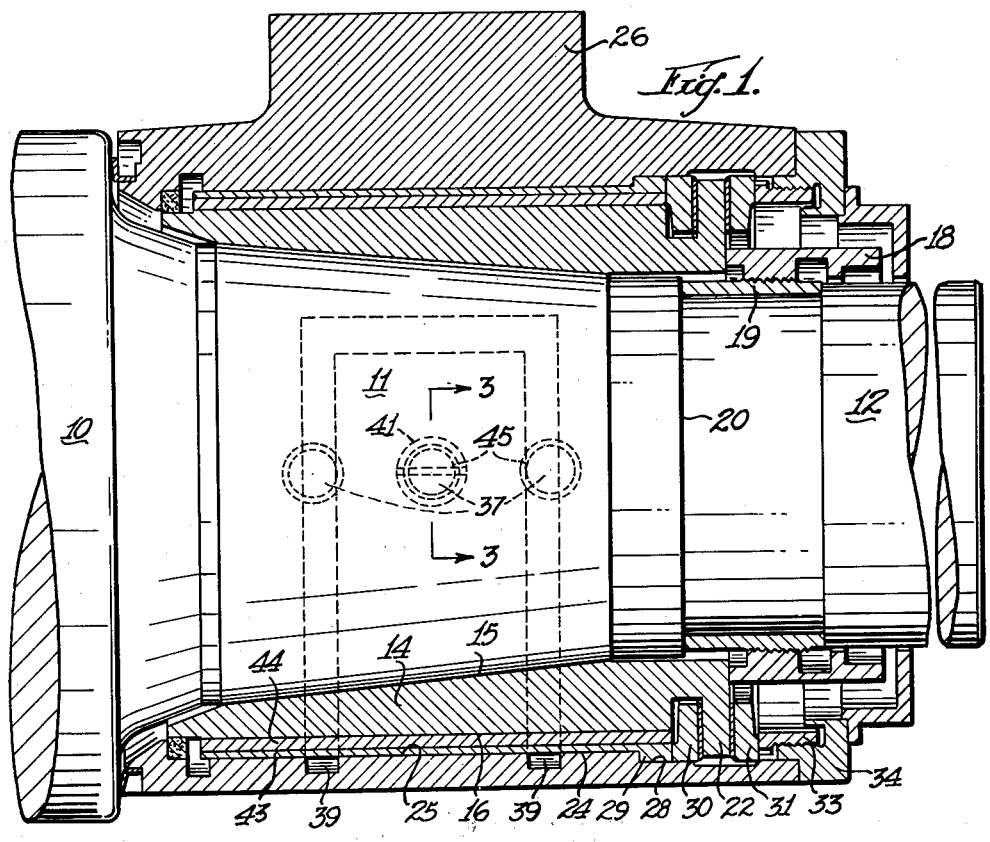

Jan. 15, 1952     J. H. HITCHCOCK     2,582,433
BEARING OF THE OIL FILM TYPE

Filed Oct. 1, 1947

INVENTOR.
John H. Hitchcock
BY
Albert G. Blodgett
Attorney

Patented Jan. 15, 1952

2,582,433

UNITED STATES PATENT OFFICE 2,582,433

BEARING OF THE OIL FILM TYPE

John H. Hitchcock, Worcester, Mass., assignor to Morgan Construction Company, Worcester, Mass., a corporation of Massachusetts Application October 1, 1947, Serial No. 777,225

7 Claims. (Cl. 308—237)

This invention relates to bearings of the oil film type, and more particularly to relatively large and heavily loaded radial bearings such as are often used for supporting the necks of rolling mill rolls.

Roll neck bearings as heretofore constructed include a heavy outer casing or chock which is bored to receive a removable hollow cylindrical bushing. Within this bushing the bearing journal rotates, there being a sufficient radial clearance between these parts for the maintenance of a film of lubricating oil. Proper radial clearance must also be provided between the bushing and the bore of the chock to permit ready assembly of the bearing and to avoid excessive compressive stresses in the bushing resulting from expansion thereof, it being understood that under operating conditions the temperature of the bushing will be appreciably higher than that of the chock. The chock in these bearings has usually been made of steel, and the bushing has included a steel shell with a lining of babbitt, cadmium or other bearing metal cast into the shell, preferably centrifugally, to provide a strong bond between the shell and the lining. While the prior bearings have in general proven highly satisfactory, there have been instances in which the inner or bearing surface of the bushing has become severely corroded, apparently by reason of some characteristic of the lubricating oil. Other bearing metals are known, such as certain aluminum alloys, which are much more resistant to corrosion by oil, but no entirely satisfactory way has been known for utilizing these metals in bearings of the type under consideration. In particular, aluminum alloys have high melting points and high coefficients of thermal expansion. It is extremely difficult to cast them into a steel shell, since they tend to shrink away from the shell upon cooling and thus prevent proper bonding of the parts. Furthermore, centrifugal casting is a very expensive operation. Nor is it feasible to make the entire bushing of aluminum, since at room temperature an excessive and impractical clearance would be required between the bushing and the surrounding chock.

It is accordingly one object of the invention to provide a thoroughly practical and dependable bearing of the oil film type capable of supporting heavy radial loads throughout a long life of useful service without appreciable corrosion from the lubricating oil.

It is a further object of the invention to provide a new and advantageous bearing for roll necks and the like, the bearing including a heavy chock and a bushing removably mounted therein, and the bushing having a lining which will support an oil film properly throughout a long and useful life without corrosion therefrom.

With these and other objects in view, as will be apparent to those skilled in the art, the invention resides in the combination of parts set forth in the specification and covered by the claims appended hereto.

Figure 2:
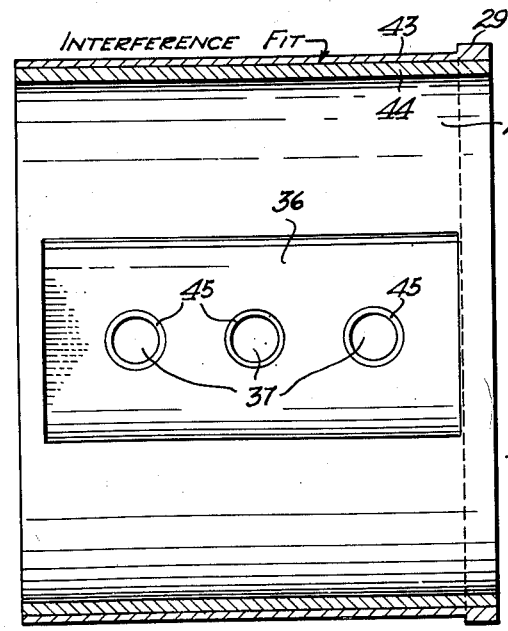
Figure 3:
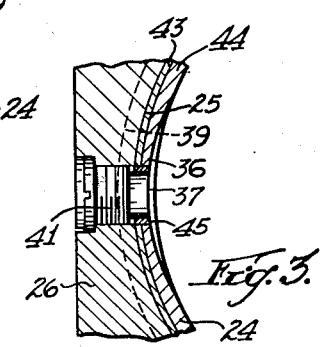

Referring to the drawings illustrating one embodiment of the invention and in which like reference numerals indicate like parts, Fig. 1 is a longitudinal section through a bearing mounted upon the neck of a rolling mill roll;

Fig. 2 is a longitudinal section through the bearing bushing removed from the chock; and Fig. 3 is a fragmentary section taken on the line 3—3 of Fig. 1.

In the drawings there is shown an oil film roll neck bearing of the general type disclosed in the patent to Dahlstrom No. 2,018,055, granted October 22, 1935. This bearing is employed to support a roll having a barrel 10, a tapered neck 11, and a roll neck extension 12. A sleeve 14, preferably of steel, is mounted on the neck 11 to rotate therewith and form a journal for the bearing. This sleeve has a tapered internal surface 15 to engage the roll neck, and a cylindrical outer surface 16 for contact with the oil film. The sleeve is held in place on the roll neck by a nut 18 which engages the outer end of the sleeve, this nut being carried by an externally threaded split ring 19 which is located within a circumferential groove 20 in the roll neck extension 12. The sleeve 14 is provided at its outer end with a radially projecting flange 22.

The cylindrical surface 16 of the sleeve 14 is surrounded by a bushing 24 which is mounted within a cylindrical bore 25 formed in a heavy outer chock or casing 26, preferably of steel. This chock 26 is provided with a counterbore 28 outwardly of the bore 25, to receive a flange 29 on the outer end of the bushing. A split thrust ring 30 is located between the outer end of the bushing and the inner surface of the sleeve flange 22, and a thrust ring 31 engages the outer surface of the flange 22. The thrust ring 31 is held in place by an adjustable ring 33 which is screw-threaded within an annular plate or closure 34 suitably attached to the outer end of the chock 26.

Provision is made for supplying oil to the inner surface of the bushing 24 so that a film of oil will be maintained between the bushing and the outer surface 16 of the sleeve 14. For this purpose the inner surface of the bushing is provided with two diametrically opposed shallow grooves or rebores 36 which terminate somewhat short of the ends of the bushing. Three holes 37 lead through the bushing into each rebore, the holes being spaced along the rebores. The holes nearest the respective ends of the bushing register, at assembly, with two circumferentially extending grooves 39 formed in the bore 25 of the chock. Oil is supplied under pressure to these grooves through other passages (not shown) in known manner, so that the rebores 36 will be filled with oil. The middle hole 37 in one side of the bushing receives the inner end of a screw 41 which is mounted in the side of the chock 26. This prevents the bushing from rotating in the chock bore 25.

The present invention is concerned with the construction of the bushing 24, and with the relationships of its internal and external diameters to the diameter of the journal surface 16 and to the diameter of the chock bore 25 respectively. In accordance with the invention, the bushing 24 comprises a hollow cylindrical outer shell 43 and a hollow cylindrical inner lining 44 engaging the inner surface of the outer shell 43 with an interference fit, so that the outer shell is stressed in tension circumferentially and the inner shell is stressed in compression circumferentially. To prevent any possibility of relative movement between these parts, a short piece of metal tubing 45 is pressed into each opening 37 to serve as a dowel. The outer shell is made of a relatively hard strong material, such as steel, and the inner lining is made of a relatively soft material, such as a suitable aluminum alloy, capable of resisting the corrosive action of lubricating oils. Such aluminum alloys are characterized by a relatively high coefficient of expansion, and if the entire bushing were made of this material an excessive radial clearance would be required, at room temperature, between the outside of the bushing and the inner surface of the chock bore 25. The effect of the composite construction is to reduce the amount of which the bushing will increase in outside diameter upon a given increase in temperature, as compared with a bushing made entirely of bearing metal. This results from the ability of the outer shell to limit, to a considerable extent, the expansion of the inner lining. While the proportions of the two parts of the bushing are not critical, it is desirable that they be constructed to obtain as small an increase in bushing diameter as possible without stressing either the shell or liner beyond its elastic limit.

In order to explain the invention and its advantages more fully, calculations will be set forth for a typical bearing. These calculations are based upon using an outer shell 43 of .20 to .30% carbon steel, and an inner lining 44 of aluminum alloy composed of 6.5% tin, 1.0% copper, 0.5% nickel, 2.5% silicon, and the balance aluminum. The physical properties of these two materials are approximately as follows:

|   | Steel | Aluminum Alloy |
| --- | --- | --- |
| Coefficient of expansion in inches per inch per degree Fahrenheit | $6.7/10^6$ | $13/10^6$ |
| Modulus of elasticity | $30 \times 10^6$ | $10 \times 10^6$ |
| Poisson's ratio | .3 | .33 |
| Yield Strength, pounds per square inch | 30,000 | 16,000 |

It will be assumed that a bushing is to be made for use in a bearing in which the journal surface 16 has a diameter of 20.25 inches and the chock bore 25 has a diameter of 21.75 inches, these dimensions being taken at room temperature of say 60 degrees F. To facilitate insertion of the bushing within the chock, the outside diameter of the bushing should be approximately 21.740 inches, giving an initial diametral clearance of .010 between the chock and the bushing, and to provide for an effective oil film the inside diameter of the bushing should be approximately 20.275 inches, giving an initial diametral clearance of .025 between the sleeve and the bushing. From previous experience it is estimated that under full load operating conditions, the temperature of the bushing and of the sleeve will be in the neighborhood of 180 degrees F. and the temperature of the bore portion of the chock will be approximately 150 degrees F.

If the bushing is made entirely of aluminum alloy, the increase in its outside diameter due to the temperature rise will be $$\frac{13}{10^6} \times 120 \times 21.74 = .034$$

and the increase in its inside diameter will be $$\frac{13}{10^6} \times 120 \times 20.275 = .032$$

At the same time, the increase in the outside diameter of the sleeve will be $$\frac{6.7}{10^6} \times 120 \times 20.25 = .016$$

and the increase in the diameter of the chock bore would be $$\frac{6.7}{10^6} \times 90 \times 21.75 = .012$$

assuming that the chock has a temperature of 150° throughout its thickness. Because the exterior of the chock radiates heat to its surroundings, the exterior will be appreciably cooler than the bore, and the actual increase of diameter of bore will be smaller than the calculation indicates.

Since .012 + .010 = .022, and .032 − .022 = .010, it will be seen that the bushing will have an interference fit of at least .010 within the chock bore at operating temperatures, in place of the initial clearance of .010. This will make it necessary to cool the bearing before the bushing can be removed therefrom. Furthermore the heavy steel chock will not yield appreciably under the interference pressure, and heavy stresses will accordingly be created in the bushing. If the outside diameter of the bushing is reduced to avoid this result, it will have an unduly loose fit within the chock bore when the parts are at room temperature. It will also be noted that while the outside diameter of the sleeve has increased .016 inch, the inside diameter of the bushing has increased .032 inch, to produce an excessive clearance of .041 inch between these parts.

The present invention provides a far more satisfactory construction, as will now be explained. For a bushing of the particular size under consideration, good design requires that the holes 37 be approximately 2 inches in diameter, and that the rebores 36 be approximately ⅛ inch deep. The radial thickness of the bushing is $$\frac{21.740 - 20.275}{2} = .7325 \text{ inches}$$

and this thickness must be suitably divided between the steel shell 43 and the aluminum alloy lining 44. It will be understood that the greater the proportionate thickness of the shell, the more restraint it will impose upon the expansion of the lining. On the other hand, if the shell is made too thick, the compression stress in the lining at operating temperature may exceed the yield strength of the material, which is undesirable. Trial calculations indicate that an interference fit of say .013 inch in diameter will be sufficient to hold the two component parts of the bushing firmly assembled at room temperature, and that the thickness of the steel shell should not appreciably exceed one-half the thickness of the lining in order to avoid over-stressing the latter at operating temperature. Accordingly, the outside diameter of the lining 44 will be accurately machined to say 21.236 inches, and its inside diameter roughly machined to approximately 20 1/8 inches. The inside diameter of the shell 43 will be accurately machined to 21.223 inches, and its outside diameter roughly machined to approximately 21 13/16 inches. The lining will then be cooled by packing it in solid carbon dioxide, or the shell will be heated by immersing it in hot oil, or both of these steps may be taken, whereupon the two parts of the bushing may readily be assembled and allowed to return to room temperature. The holes 37 will then be machined and the short tubes 45 pressed therein, after which the assembled bushing will be finish machined to provide an outside diameter of 21.740 inches and an inside diameter of 20.275 inches.

It will be understood that when the bushing 24 is completed and at room temperature the shell 43 will have a slight initial circumferential tension stress, and the lining 44 will have a slight initial circumferential compression stress, because of the interference fit between these parts. When the bushing is placed in service and its temperature is thereby increased, the lining will tend to expand more than the shell, because of the difference in the coefficients of thermal expansion of the two materials. Accordingly the steel shell will restrain the expansion of the aluminum alloy lining, with resultant increase in the stresses, and the increase in diameter for a given temperature rise will be much less than with a bushing made entirely of aluminum alloy. Thus, calculations under well known formulas indicate that with the particular bushing described, and an assumed working temperature of 180 degrees F., the outside diameter of the composite bushing will have increased only .023 inch as compared with .034 inch for an aluminum alloy bushing. Under these conditions, with due allowance for the weakening effect of the holes 37 and the rebores 36, the maximum stress in the shell will be approximately 15,900 pounds per square inch, and the maximum stress in the alloy lining will be approximately 10,910 pounds per square inch, these stresses being well within the yield strengths of the respective materials. The pronounced reduction in the expansion of the bushing avoids the necessity for an excessive clearance between the bushing and the bore of the chock at room temperature and it also provides a much more uniform clearance, under various temperature conditions, between the rotating journal and the inner surface of the bushing. This is of great importance in obtaining a proper oil film without excessive endwise flow of the oil. The invention avoids the expensive process of centrifugally casting linings of bearing metal into the shells, and it makes it possible to employ aluminum alloy linings which are not subject to corrosion from the oil.

Having thus described my invention, what I claim as new and desire to secure by Letters Patent is:

1. A bushing for an oil film bearing comprising an outer shell constructed of steel and having a cylindrical outer surface and a cylindrical bore, and an inner lining constructed of an aluminum alloy having a high resistance to corrosion from lubricating oil and a coefficient of thermal expansion appreciably greater than that of steel, the lining having a cylindrical outer surface which is accurately proportioned to fit tightly within the bore of the shell at assembly, so that the shell will yieldably restrict the expansion of the lining when the temperature of the bushing increases under operating conditions, and the relative radial thicknesses of the shell and lining being such that the stresses in these parts will remain below the yield strength as they reach normal operating temperature.

2. A bushing as set forth in claim 1, in which the radial thickness of the shell is appreciably less than that of the lining.

3. A bushing as set forth in claim 1, in which the radial thickness of the shell is approximately one half that of the lining.

4. A bushing for an oil film bearing comprising an outer shell constructed of a strong hard metal having a cylindrical outer surface and a cylindrical bore, and an inner lining constructed of a bearing metal softer than the shell and with a coefficient of thermal expansion appreciably greater than that of the shell, the parts having an interference fit at room temperature, and the lining being thicker than the shell to prevent overstressing of the lining due to the elastically yieldable restraint imposed thereon by the shell as the bushing temperature increases under operating conditions.

5. An oil film bearing comprising a chock having a cylindrical bore, a shell shaped substantially as a hollow cylinder and constructed of a strong hard metal, the shell being mounted within the chock bore with a slight radial clearance to facilitate assembly, and an inner lining shaped substantially as a hollow cylinder and constructed of a bearing metal with a coefficient of thermal expansion appreciably greater than that of the shell, the lining having an interference fit within the shell at room temperature so that the shell will yieldably restrict the expansion of the lining when the temperature of the lining and shell increases under operating conditions.

6. An oil film bearing as set forth in claim 5, in which the relative radial thicknesses of the shell and lining are such that the stresses in these parts will remain below the yield strength as they reach normal operating temperature.

7. An oil film bearing comprising a chock having a cylindrical bore, a shell shaped substantially as a hollow cylinder and constructed of a strong hard metal, the shell being mounted within the chock bore with a slight radial clearance to facilitate assembly, an inner lining shaped substantially as a hollow cylinder and constructed of a bearing metal having a coefficient of thermal expansion appreciably greater than that of the shell, and a journal rotatable within the lining with a radial clearance to accommodate a film of lubricating oil, the lining engaging the inner surface of the shell with an interference fit at room temperature, the shell serving yieldably to restrict the expansion of the lining when the temperature of the lining and shell increases under operating conditions and thereby prevent excessive variations in the said radial clearances.

JOHN H. HITCHCOCK.

REFERENCES CITED

The following references are of record in the file of this patent:

UNITED STATES PATENTS

| Number | Name | Date |
|---|---|---|
| 1,346,535 | Fedden et al. | July 13, 1920 |
| 1,469,793 | Johnson | Oct. 9, 1923 |
| 2,018,055 | Dahlstrom | Oct. 22, 1935 |
| 2,177,040 | Huhn | Oct. 24, 1939 |
| 2,213,302 | Buske | Sept. 3, 1940 |
| 2,277,023 | Steiner et al. | Mar. 17, 1942 |